Aug. 5, 1952     E. DE W. BELL     2,606,313
DIRECT CURRENT REVERSE POWER CONTROLLER
Filed Feb. 8, 1951
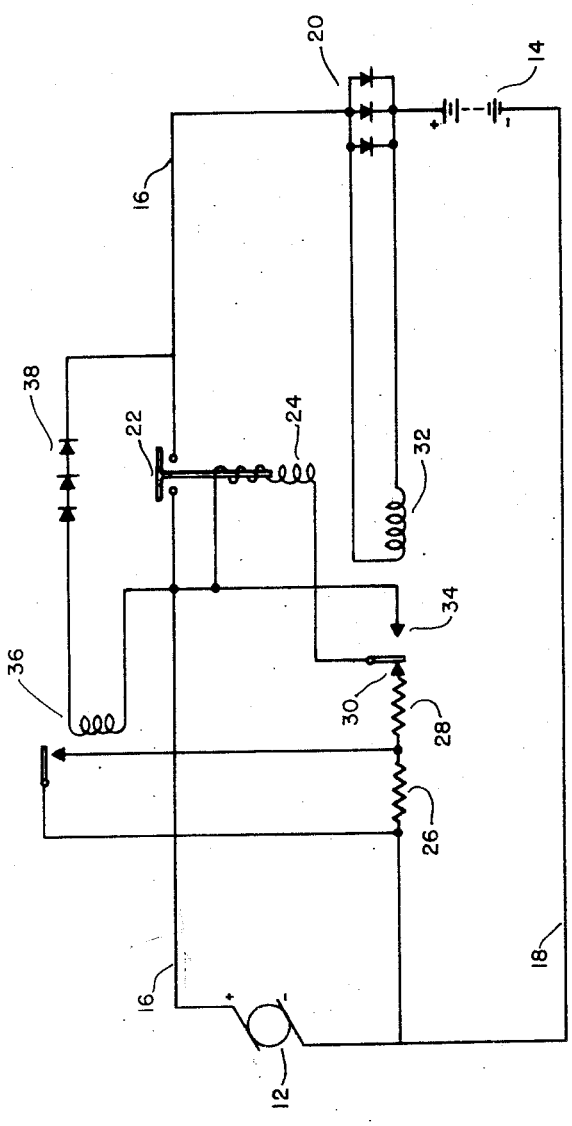
INVENTOR.
EMERSON DeWITT BELL
BY
Harry M. Saragovitz
Attorney Patented Aug. 5, 1952

2,606,313

UNITED STATES PATENT OFFICE 2,606,313

DIRECT CURRENT REVERSE POWER CONTROLLER

Emerson De Witt Bell, Interlaken, N. J.

Application February 8, 1951, Serial No. 210,045

4 Claims. (Cl. 320—34)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to direct current power controllers and more particularly to power controllers for battery charging used in conjunction with generators having an arbitrarily varying speed.

Power control circuits used in conjunction with generators driven from a source having variable speed, as for example, a wind driven generator, present several problems which previously have been solved in various ways. Dry plate rectifiers have been suggested for use in such circuits to allow charging of the batteries when the generator potential is greater than that of the batteries and to prevent reverse power discharge from the battery when the generator potential drops. However, a sufficient number of dry plate rectifiers to permit feasible operation of such a circuit necessitates the use of large numbers of rectifier plates, making the equipment heavy and expensive.

Relay circuits are frequently used in applications of this kind. If these circuits are adjusted to cut the generator in and out at the point of minimum current flow, excessive contactor chatter generally results. Such circuits may also require the use of expensive voltage sensitive relays. Adjustment may be made to allow for a sufficiently large differential between the contactor-make and contactor-break potentials so as to prevent undesirable contactor chatter. However, the making and breaking of the main circuit contactor while carrying heavy current may result in burning of the contacts, thus shortening the life of such devices.

This invention provides a direct current reverse power controller utilizing selenium rectifiers to apply power from a direct-current generator to the storage batteries. These rectifiers block the reverse power flow, when the generator is at a lower voltage than the storage batteries, only when the voltage difference of the generator and the batteries is within a predetermined limit, thus reducing the required number of selenium cells. A contactor is utilized to break the circuit when the generator voltage drops below the battery voltage by an amount in excess of the predetermined limited voltage difference and to reconnect the circuit when the generator voltage rises above the voltage of the batteries. Relays are used to open and close the contactor when the generator and the batteries reach the appropriate voltage relationships.

In this manner, a direct-current reverse power controller is achieved which combines dry plate rectifiers, a contactor, and inexpensive relays minimizing both contactor chatter and contact burning without sacrifice of available charging time when the generator is at a higher voltage than the batteries.

Other objects and features are embraced in the description and the discussion of a preferred embodiment of the invention which follows, particular reference being had to the drawing, which is a schematic circuit diagram of the preferred embodiment.

Generator 12, charges the storage battery 14 through main power circuit lines 16 and 18. Dry plate rectifiers 20 arranged for parallel operation and a normally open circuit contactor 22 are connected in series in line 16 between the generator and the storage batteries. The numbers of rectifiers used should be sufficient to freely pass power from the generator 12 to the batteries 14 at a voltage equal to the difference between the maximum generator voltage and the minimum battery voltage.

An actuating circuit for the coil 24 of the main circuit contactor 22 comprises a first resistance 26 and a second resistance 28 connected in series between one side of generator 12 and a front contact 30 of relay 32. The armature of relay 32 is normally closed against its front contact 30 and is also connected in series through the actuating coil 24 of the circuit contactor 22 to the other side of the generator. The actuating coil of relay 32 is connected across the rectifiers 20 so that a sufficient blocking voltage across the rectifiers, developed when the generator voltage drops below the battery voltage, will operate relay 32, thus breaking the contactor coil circuit. Back contact 34 of relay 32 is connected to one end of the contactor coil 24, and the armature of relay 32 is connected to the opposite end of coil 24, so that operation of the relay will also short circuit the contactor coil, thereby collapsing its magnetic flux and hastening the release action thereof.

The actuating coil of a second relay 36 and a sufficient number of rectifier plates 38 are arranged in series and are connected to line 16 in parallel with circuit contactor 22, to substantially block the flow of power from a fully charged battery to an idle generator. An appreciable current will flow through the coil of relay 36 only when the generator voltage is higher than the battery voltage. The normally open armature of relay 36 is connected to one end of resistor 26 and the single contact is connected to the other end of the same resistor.

When the generator voltage rises above the battery voltage, therefore, current will pass from the generator through rectifier 20 to the batteries through the main power lines 16 and 18 and around the open contactor 22 through the coil of relay 36 and rectifier 38. Relay 36 will close, shorting resistance 26 and thereby placing a sharply increased voltage drop across the actuating coil 24, closing the contactor 22. The closure of contactor 22 allows the application of power through the main lines 16 and 18 and rectifier 20 to the battery and also short circuits relay 36 and rectifier 38. Relay 36 therefore is reopened reintroducing resistance 26 to the circuit of the actuating coil 24. Contactor 22 now serves as a holding relay.

Actuating coil 24 and resistances 26 and 28 are designed so that the contactor 22 will be closed whenever the generator voltage is greater than the voltage under load of a fully discharged battery and resistance 26 is shorted. Once closed, the contactor is capable of holding with resistance 26 reintroduced into the circuit of the actuating coil until a sufficient blocking voltage is developed across rectifier 20, opening relay 32 and releasing the contactor.

Selenium rectifiers have been developed which will stand a blocking voltage of about 20 volts per plate without appreciable current leakage at normal operating temperatures. For this reason selenium cells are preferable to copper oxide in rectifiers of this kind, though either kind may be used.

If rectifier 20 is composed of single selenium cells operating in parallel the release relay 32 may be set to operate at about 16 volts.

In a reverse power controller of this description a 3.2 ampere wind driven direct-current generator having a maximum voltage of 140 volts may be operated in parallel with a 60 cell storage battery which, when not loaded, will vary from a maximum of 129 volts to a minimum of 105 volts. The start charge voltage of such a battery is 123.6 volts.

The value of resistances 26 and 28 may be chosen so that the contactor will close when the generator reaches 123 volts. Because the battery cannot rise above 130 volts and the rectifier 20 will block up to 16 volts before operating release relay 32, no reverse power will flow regardless of the battery voltage. Where the battery is fully charged, therefore, release relay 32 will open the contactor 22 when the generator falls to 114 volts and the contactor will not close until the generator rises again to 123 volts, thereby allowing a 9 volt difference between contactor make and break and also insuring the connection of the generator to the battery whenever the generator voltage is at or above the start charge voltage of the battery.

Resistor 28 may be of sufficient value so that, with resistor 26 shorted out, the contactor 22 will close with a generator voltage of 100 volts. It is important, when the contactor closes, that minimal current is flowing so as to reduce burning of the contacts. For this reason the contactor is closed by means of closing relay 36 whenever the generator voltage rises above the voltage of the battery despite the fact that the generator may be below the start charge voltage of the battery.

The values given apply to one value of battery and generator voltages. However, the circuit can be adapted to any combination of generator and battery voltages and for any value of current output. The invention can also be used with several generators operating in parallel using the line voltage supplied by the other generators as the base criteria for the operation of the subject invention.

From the foregoing description taken in connection with the drawing, the construction and mode of operation of this improved direct-current reverse power control circuit will be readily understood without a further and extended description and its many advantages will be apparent to those versed in the art. While the structural organization herein shown is preferred, it will, of course, be understood that changes in the form, construction, proportions, and arrangements of the parts may be made, within the scope of the appended claims, without departing from the spirit or sacrificing any of the advantages of the invention.

What is claimed is:

1. A device for regulating the application of power from a first power source to a parallel second power source comprising a circuit contactor, rectifier means for applying power from the first source to the second source and for substantially preventing within a predetermined voltage difference the application of power in the reverse direction, said contactor and said rectifier means being connected in series between the said two power sources, means to close the circuit contactor when the voltage of the first source is greater than the voltage of the second source, and means to open said circuit contactor when the voltage of the first source drops below the voltage of the second source by an amount greater than said predetermined voltage difference.

2. A reverse power controller for regulating the application of power from a first power source of varying voltage to a second power source connected in parallel to said first source comprising a circuit contactor, dry plate rectifier means for applying power from said first source to said second source and for substantially preventing within a predetermined voltage difference the application of power in the reverse direction, said contactor and said dry plate rectifier means being connected in series between the said two power sources, means to close the circuit contactor when the voltage of the first source is higher than the voltage of the second source, and relay means responsive to the voltage across the dry plate rectifier means to open said circuit contactor when the voltage of the said first source drops below the voltage of the said second source by an amount greater than the said predetermined voltage difference.

3. A direct current reverse power controller for regulating the application of power from a generator means having a varying output voltage connected in parallel to a storage battery means comprising a circuit contactor, dry plate rectifier means for applying power from said generator means to said storage battery means and for blocking within predetermined limits of voltage difference the application of reverse power when the generator voltage is lower than the battery voltage, said circuit contactor and said dry plate rectifier means being connected in series between the generator means and the storage battery means, means to close the circuit contactor when the voltage of the generator means is higher than the voltage of the storage battery means, and relay means responsive to the voltage across the dry plate rectifier means to open said circuit contactor when the voltage of the generator means drops below the voltage of the storage battery means by an amount greater than the said predetermined limits of voltage difference.

4. A direct current reverse power controller for regulating the application of power from a generator means having a varying output voltage to a storage battery means comprising a normally open circuit contactor, a first dry plate rectifier means for applying power from said generator means to said storage battery means and for substantially blocking within a predetermined voltage difference the application of reverse power, said circuit contactor and said first dry plate rectifier means being connected in series between the generator means and the storage battery means, an actuating circuit for the coil of the said circuit contactor having a resistance, a normally closed relay, and the coil of the circuit contactor connected in series across the said generator means, a normally open relay connected across the ends of the resistance, a second dry plate rectifier means for blocking reverse power from the storage battery means to the generator means connected in series with the actuating coil of the normally open relay across the said circuit contactor whereby transmission of power from the generator means to the storage battery means through the actuating coil of the normally open relay and the second dry plate rectifier means will short circuit the said resistance and close the circuit contactor, the normally closed relay having an actuating coil connected across the said first dry plate rectifier means whereby the circuit contactor will open when the generator means voltage drops below the storage battery means voltage by an amount in excess of the said predetermined voltage difference.

EMERSON DE WITT BELL.

REFERENCES CITED

The following references are of record in the file of this patent:

UNITED STATES PATENTS

| Number | Name | Date |
| --- | --- | --- |
| 926,164 | Bliss | June 29, 1909 |
| 1,040,496 | Bliss | Oct. 8, 1912 |
| 1,078,654 | Woodbridge | Nov. 18, 1913 |
| 1,335,120 | Lum | Mar. 30, 1920 |
| 2,067,420 | Seeger et al. | Jan. 12, 1937 |
| 2,155,229 | Hoffman | Apr. 18, 1939 |
| 2,334,289 | Richards | Nov. 16, 1943 |
| 2,510,141 | Richards | June 6, 1950 |

FOREIGN PATENTS

| Number | Country | Date |
| --- | --- | --- |
| 289,939 | Great Britain | Nov. 2, 1927 |